US008533272B2

(12) United States Patent
Alicherry et al.

(10) Patent No.: US 8,533,272 B2
(45) Date of Patent: Sep. 10, 2013

(54) METHOD AND APPARATUS FOR NOTIFICATION AND DELIVERY OF MESSAGES TO MOBILE PC USERS

(75) Inventors: Mansoor Ali Khan Alicherry, Westfield, NJ (US); Mary S. Chan, Chatham, NJ (US); Sanjay D. Kamat, Marlboro, NJ (US); Pramod V. N. Koppol, Manalapan, NJ (US); Sunder Rathnavelu Raj, Marlboro, NJ (US); Dimitrios Stiliadis, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1500 days.

(21) Appl. No.: 11/668,800

(22) Filed: Jan. 30, 2007

(65) Prior Publication Data

US 2008/0183825 A1 Jul. 31, 2008

(51) Int. Cl.
*G06F 12/14* (2006.01)
(52) U.S. Cl.
USPC ................ 709/206; 709/205; 713/192; 726/6
(58) Field of Classification Search
USPC .................................................. 709/206, 207
See application file for complete search history.

(56) References Cited

U.S. PATENT DOCUMENTS

| 6,629,248 B1 | 9/2003 | Stachura et al. |
| 6,894,994 B1 * | 5/2005 | Grob et al. ................... 370/335 |
| 2002/0129107 A1 | 9/2002 | Loughran |
| 2003/0002676 A1 | 1/2003 | Stachura |
| 2003/0012382 A1 | 1/2003 | Ferchichi et al. |
| 2004/0133668 A1 | 7/2004 | Nicholas, III |
| 2005/0138143 A1 | 6/2005 | Thompson |
| 2006/0069742 A1 * | 3/2006 | Segre ............................. 709/217 |
| 2007/0130457 A1 | 6/2007 | Kamat et al. |
| 2007/0162582 A1 | 7/2007 | Belali et al. |

OTHER PUBLICATIONS

U.S. Appl. No. 11/293,843, filed Dec. 2, 2005, Kamat et al.
PCT/US2008/000525, Jun. 19, 2008, Lucent Technologies Inc.
PCT Search Report & Written Opinion in PCT/US2006/046218, Lucent Technologies Inc., Applicant, dated May 10, 2007, 13 pages.
$2^{nd}$ Written Opinion in PCT/US2008/000525, Lucent Technologies Inc., Applicant, dated Aug. 4, 2009, 5 pages.
IPRP in PCT/US2008/000525, Lucent Technologies Inc., Applicant, dated Dec. 5, 2009, 10 pages.

* cited by examiner

*Primary Examiner* — Backhean Tiv
(74) *Attorney, Agent, or Firm* — Wall & Tong, LLP

(57) ABSTRACT

The invention includes a method and apparatus for notification and delivery of messages to mobile users using a secure client associated with a user device. The secure client includes a power module, a communication module, a storage module, and an alert module. The power module powers the client device independent of a power state of the user device. The communication module receives a wake-up message and responsively triggers the secure client to switch from an inactive state to an active state without changing the power state of the user device, initiates a secure connection with a secure gateway in response to the wake-up message, and requests and receives a user message from a messaging application using the secure connection. The storage module stores the received message independent of the power state of the user device. The alert module activates an alert to indicate that the message is available.

15 Claims, 8 Drawing Sheets

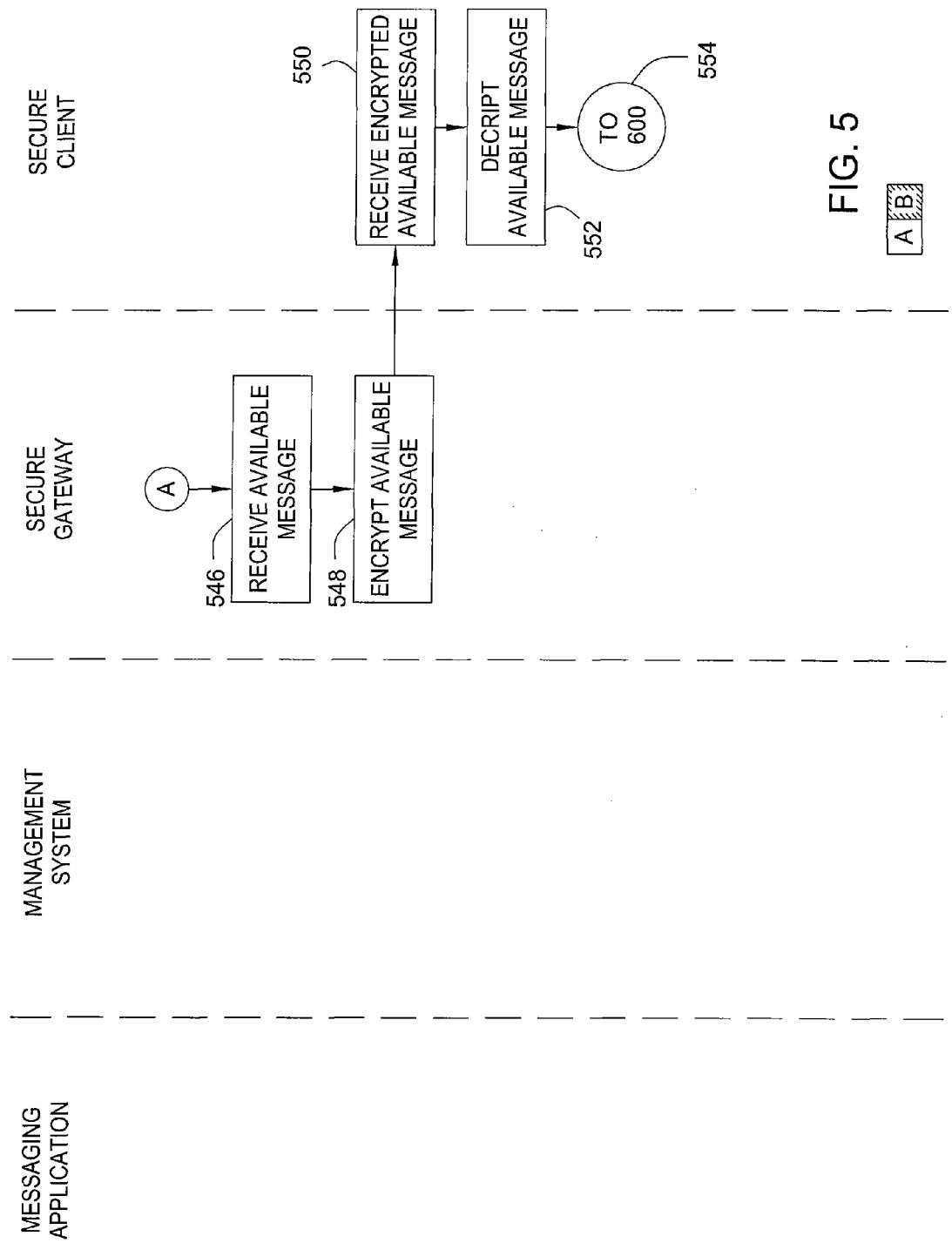

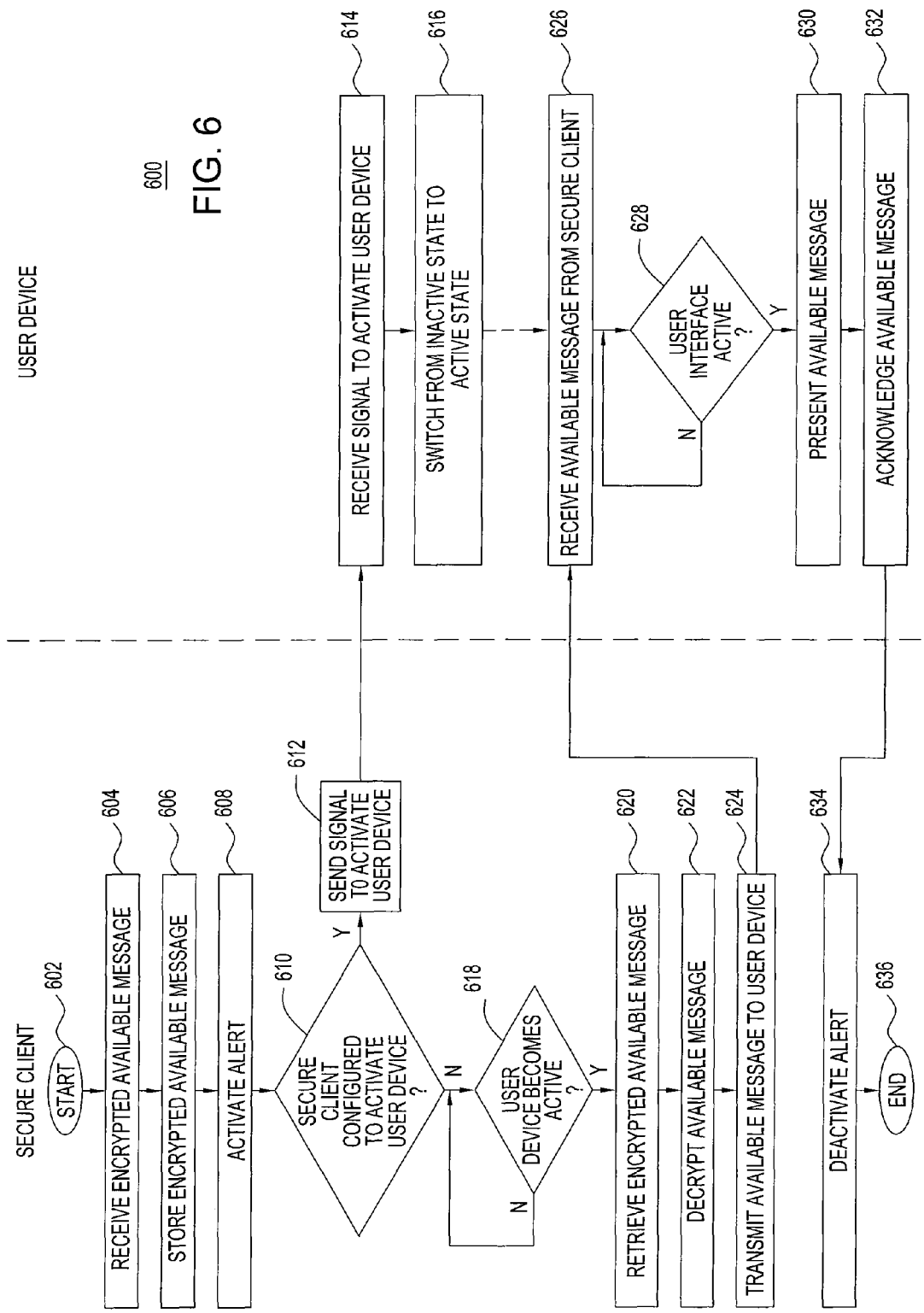

METHOD AND APPARATUS FOR NOTIFICATION AND DELIVERY OF MESSAGES TO MOBILE PC USERS

CROSS-REFERENCE TO RELATED APPLICATION

The present patent application is related to commonly assigned patent application Ser. No. 11/293,843 entitled "Method and Apparatus For Providing Secure Remote Access To Enterprise Networks," filed Dec. 2, 2005, which is hereby incorporated by reference in its entirety.

FIELD OF THE INVENTION

The invention relates to the field of communication networks and, more specifically, to secure messaging for remote enterprise users.

BACKGROUND OF THE INVENTION

Many enterprises provide employees with the capability to connect to the enterprise network from remote locations (e.g., telecommuting from home, working from a hotel while traveling for business, and the like). These enterprise employees are known as remote enterprise users. Many such enterprises also operate enterprise messaging servers, known as Unified Messaging Systems (UMSs), which allow remote enterprise users to connect to the enterprise network in order to access e-mail and voicemail messages. Disadvantageously, however, remote enterprise users are forced to connect to the enterprise messaging servers periodically in order to avoid long delays in receiving important messages, thereby reducing enterprise user efficiency and consuming valuable enterprise network resources.

SUMMARY OF THE INVENTION

Various deficiencies in the prior art are addressed through the invention of a method and apparatus for notification and delivery of messages to mobile users using a secure client associated with a user device. The secure client includes a power module, a communication module, a storage module, and an alert module. The power module powers the secure client device independent of a power state of the user device. The communication module receives a wake-up message and responsively triggers the secure client to switch from an inactive state to an active state without changing the power state of the user device, initiates a secure connection with a secure gateway in response to the wake-up message, and requests and receives a user message from a messaging application using the secure connection. The storage module stores the received message independent of the power state of the user device. The alert module activates an alert to indicate that the message is available.

BRIEF DESCRIPTION OF THE DRAWINGS

The teachings of the present invention can be readily understood by considering the following detailed description in conjunction with the accompanying drawings, in which:

FIG. 6 depicts a method according to one embodiment of the present invention.

To facilitate understanding, identical reference numerals have been used, where possible, to designate identical elements that are common to the figures.

DETAILED DESCRIPTION OF THE INVENTION

As described herein, the present invention generally includes a self-powered secure client associated with a user device. The secure client is capable of communicating even when the user device is turned off. The secure client includes a remote wake-up capability (enabled using out-of-band signaling) such that a remote messaging can wake up the secure client without waking the user device, thereby conserving power and resources. The secure gateway does not know the IP address of the secure client. The out-of-band signaling allows the secure client to be awoken using a global identifier, thereby enabling the secure client to initiate a request for a secure connection with the secure gateway, whereby the secure client is assigned an IP address. Using the IP address and the secure connection, the secure client requests, receives, and stores messages intended for a user associated with the user device independent of the state of the user device (e.g., even when the user device is turned off). The secure client includes a capability to generate and present one or more alerts via the secure client such that the user is informed that a message is available even when the user device is turned off. As described herein, various other versions of these features and combinations of these features and functions may be provided by the present invention, as well as numerous other features and functions depicted and described herein.

Figure 1:
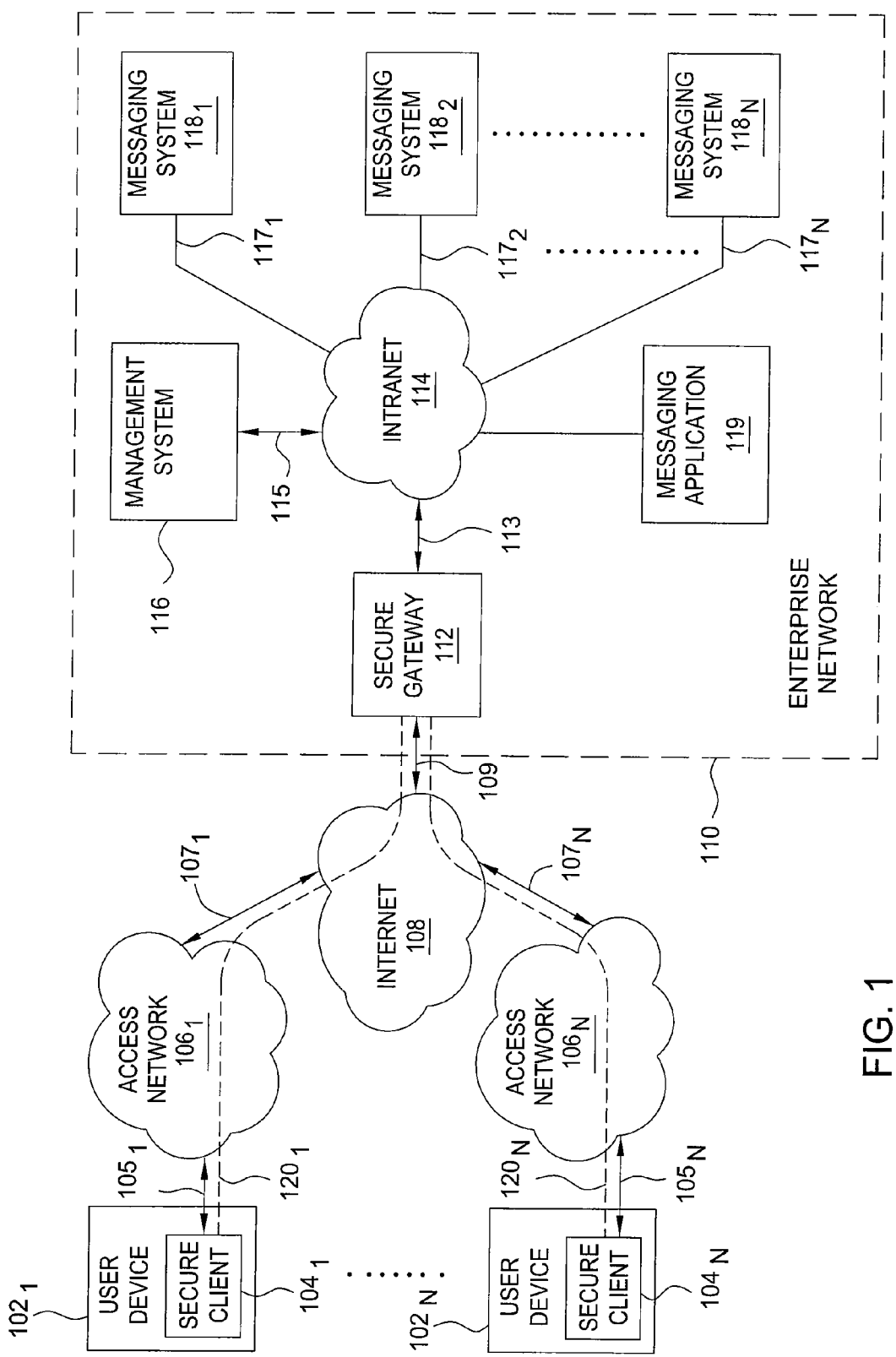
FIG. 1 depicts a high-level block diagram of a communication network.

FIG. 1 depicts a high-level block diagram of a communication network. Specifically, communication network 100 includes a plurality of user devices (UDs) $102_1$-$102_N$ (collectively, UDs 102) communicating with an enterprise network (EN) 110. The UDs $102_1$-$102_N$ communicate with EN 110 using a respective plurality of access networks (ANs) $106_1$-$106_N$ (collectively, ANs 106) and a public communication network 108 (denoted as Internet 108). As depicted in FIG. 1, UD $102_1$ communicates with AN $106_1$ using a communication link (CL) $105_1$ and UD $102_N$ communicates with AN $106_N$ using a communication link (CL) $105_N$ (CLs $105_1$-$105_N$ are collectively denoted as CLs 105). The ANs $106_1$-$106_N$ communicate with Internet 108 using a plurality of communication links (CLs) $107_1$-$107_N$ (collectively, CLs 107), respectively. The Internet 108 communicates with EN 110 using a communication link 109.

Figure 2:
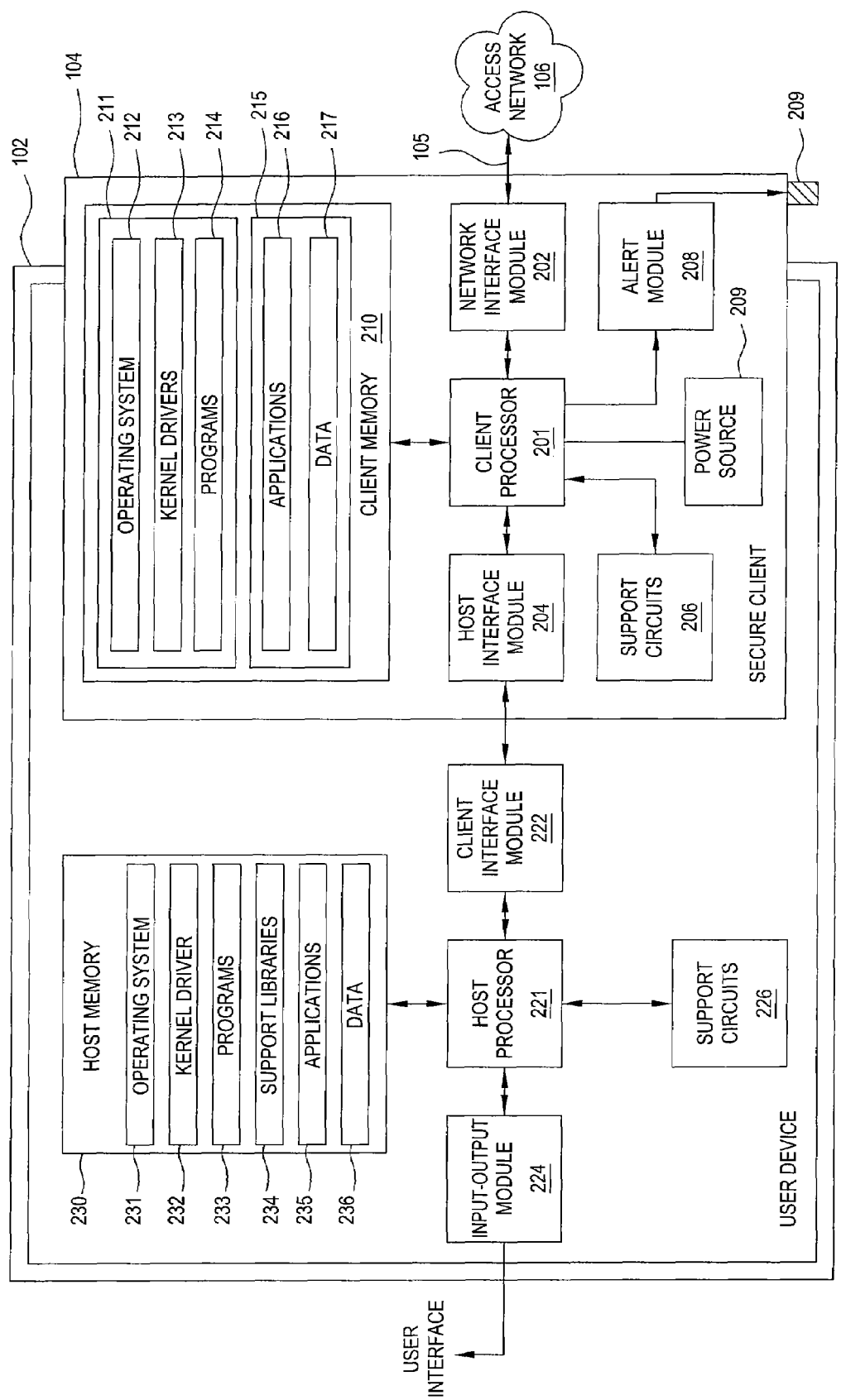
FIG. 2 depicts a high-level block diagram of a user device, including an associated secure client, of the communication network of FIG. 1.

As depicted in FIG. 1, UDs 102 include any user devices adapted for transmitting and receiving messages, as well as presenting messages to one or more end users associated with UDs 102. For example, UDs 102 may include desktop computers, laptop computers, personal digital assistants (PDAs), and the like, as well as various combinations thereof. The UDs 102, which may be better understood with respect to FIG. 2, provide at least a portion of the functions of the present invention, including notifying users about the availability of messages (e.g., via one or more user interfaces of UDs 102, via one or more other devices (e.g., cell phone, pager, and the like), and the like), presenting available messages to users, as well as other functions of the present invention, as depicted and described herein.

As depicted in FIG. 1, UDs $102_1$-$102_N$ include a plurality of secure clients (SCs) $104_1$-$104_N$ (collectively, SCs 104). The SCs 104 support secure connections with SG 112 of EN 110, thereby enabling secure communications between UDs 102 and EN 110 (and thus supporting secure communications for remote enterprise users). The SCs 104, which may be better understood with respect to FIG. 2, provide at least a portion of the functions of the present invention, including initiating establishment of secure connections when associated UDs 102 are inactive, alerting users to available messages when UDs 102 are inactive, as well as other functions of the present invention, as depicted and described herein.

As depicted in FIG. 1, ANs 106 include any access networks adapted for facilitating communications between UDs 102 and EN 110. In one embodiment, at least a portion of ANs 106 include wireline access networks, such as cable television (CATV) networks, digital subscriber line (DSL) networks, and the like. In one embodiment, at least a portion of ANs 106 include wireless networks, such as General Packet Radio Service (GPRS) networks, Universal Mobile Telecommunications System (UMTS) networks, 1x Evolution (1XEV) data only (EVDO) networks, single carrier (1x) radio transmission technology (1xRTT) networks, high-speed downlink packet access (HSPDA) networks, Wireless Fidelity (WiFi) networks, and like public and private wireless networks. Thus, different instantiations of CSs 104 may support different combinations of wireline and/or wireless network interfaces.

As depicted in FIG. 1, EN 110 is a secure, private network associated with an enterprise. Specifically, EN 110 includes a secure gateway (SG) 112, private communication network 114 (denoted as Intranet 114), a management system (MS) 116, a plurality of messaging systems (MSs) $118_1$-$118_N$ (collectively, MSs 118), and a messaging application (MA) 119. The SG 112 communicates with Intranet 114 using a communication link (CL) 113. The MS 116 communicates with Intranet 114 using a communication link (CL) 115. The MSs $118_1$-$118_N$ communicate with Intranet 114 using a plurality of communication links (CLs) $117_1$-$117_N$ (collectively, CLs 117). Although primarily depicted and described herein with respect to a private enterprise network, the present invention may be used for securely delivering message from any private network (e.g., university networks, organization networks, and the like).

As depicted in FIG. 1, SG 112 controls communications entering EN 110 and communications leaving EN 110. The SG 112 is adapted for supporting secure connections with SCs 104 of UDs 102, including initiating secure connections with SCs 104 of UDs 102, and responding to requests for secure connections received from SCs 104 of UDs 102. In one embodiment, at least a portion of the functions of SG 112 may be controlled by MS 116. The SG 112 performs at least a portion of the functions of the present invention, including encrypting messages transmitted to SCs 104, decrypting messages received from SCs 104, as well as other functions of the present invention, as depicted and described herein.

The MS 116 controls interactions between SG 112 and SCs 104 of UDs 102. The MS 116 communicates with SG 112 and SCs 104 of UDs 102, as well as other elements, for performing at least a portion of the functions of the present invention, including sending messages to SCs 104 adapted for triggering SCs 104 to switch from an inactive state to an active state, sending messages to SCs 104 adapted for triggering SCs 104 to initiate a request to establish a secure connection with SG 112 and to request delivery of available messages over the secure connection, as well as other functions of the present invention, as depicted and described herein. The MS 116 communicates with MA 119 (and, optionally, MSs 118) for performing at least a portion of the functions of the present invention, such as providing user reachability information to MA 119, as well as other functions of the present invention as depicted and described herein.

The MSs 118 include messaging systems adapted for receiving, storing, and forwarding messages intended for end users. The MSs 118 may include text messaging systems, voicemail messaging systems, multimedia messaging systems, and the like, as well as various combinations thereof, adapted for receiving, storing, and forwarding text messages, voicemail messages, multimedia messages, and the like, as well as various combinations thereof. For example, at least a portion of MSs 118 may include private automated branch exchanges (PABXs), unified messaging systems (UMSs), and the like, as well as various combinations thereof. In one embodiment, at least a portion of MSs 118 may host one or more messaging applications.

The MA 119 is a messaging application. The MA 119 may be hosted on any device adapted for supporting various functions provided by MA 119. The MA 119 communicates with MSs 118 to receive indications that messages intended for users of UDs 102 are available (and, optionally, to obtain messages intended for users of UDs 102). The MA 119 communicates with MS 116 to trigger MS 116 to send messages to SCs 104 that are adapted to trigger SCs 104 to switch from an inactive state to an active state, to initiate establishment of secure connections with SG 112 for securely receiving messages intended for users of UDs 102, and to request delivery of available messages (from MA 119 or MSs 118) over the secure connections. The MA 119 performs various other functions of the present invention, as depicted and described herein.

Although depicted and described as an individual application, in one embodiment MA 119 may be hosted on one of MSs 118 or, alternatively, messaging applications adapted for performing functions of the present invention may be hosted on MSs 118. Although depicted and described as an individual application, in one embodiment, each of the individual MSs 118 may perform at least a portion of the functions depicted and described herein as being performed by MA 119. In one such embodiment, existing messaging applications (e.g., text messaging applications, voicemail messaging applications, multimedia messaging applications, and the like), e.g., messaging applications hosted by MSs 118, may be adapted for performing functions depicted and described herein as being performed by MA 119. In alternative implementations various combinations of messaging systems, messaging systems, and/or management systems may be hosted within one or more computers.

As depicted in FIG. 1, SCs 104 communicate with EN 110 using a plurality of secure connections (SCs) $120_1$-$120_N$ (collectively, SCs 120). The SCs 120 support secure transport of information between SCs 104 and SG 112 of EN 110 (and thus between UDs 102 and any systems of EN 110). The SCs 120 may be initiated by SCs 104 (e.g., in response to a request from the associated UD 102, in response to a request from MS 116 or MA 119 of EN 110, and the like). The SCs 120 may be supported by SCs 104 irrespective of the power state of respective UDs 104 (i.e., irrespective of whether UDs 102 are in active power states or inactive power states). In one embodiment, SCs 120 include secure tunnels. In one such embodiment, SCs 120 include Internet Protocol Security (IPSec) tunnels.

Although primarily depicted and described herein as a communication network supporting IP-based communications, communication network 100 may support various different communication technologies. Although primarily depicted and described with respect to specific numbers, types, and configurations of UDs 102 (and SCs 104), CLs 105, ANs 106, CLs 107, Internet 108, CL 109, SG 112, CL 113, Intranet 114, CL 115, MS 116, CLs 117, MSs 118, and MA 119, various other numbers, types, and configurations of UDs 102 (and SCs 104), CLs 105, ANs 106, CLs 107, Internet 108, CL 109, SG 112, CL 113, Intranet 114, CL 115, MS 116, CLs 117, MSs 118, and MA 119 may be used to provide various functions of the present invention. The UDs 102 and associated SCs 104 may be better understood with respect to FIG. 2.

FIG. 2 depicts a high-level block diagram of a user device (referred to as the host or host computer), including an associated secure client, of the communication network of FIG. 1. As depicted in FIG. 2, SC 104 includes a client processor (CP) 201, a network interface module (NIM) 202, a host interface module (HIM) 204, support circuits (SCs) 206, an alert module (AM) 208, a power source (PS 207), and a client memory (CM) 210 (including a volatile memory (VM) 211 and a nonvolatile memory (NM) 215. The CP 201 communicates with, and coordinates interactions between, each of NIM 202, HIM 204, SCs 206, AM 208, and CM 210 for performing at least a portion of the functions of the present invention, including initiating secure connections with SG 112, activating alerts indicating availability of messages (irrespective of the power state of UD 102), storing messages in NM 215 until the messages are read by UD 102, providing available messages to UD 102 in response to detecting that UD 102 is active, and performing like functions, as well as various combinations thereof, as depicted and described herein.

As depicted in FIG. 2, in one embodiment SC 104 may be implemented as a card inserted within a slot of UD 102. In one embodiment, for example, SC 104 may be implemented in a Cardbus (32-bit) PC-Card format. In one embodiment, SC 104 may be compatible with PC platforms supporting a type-II PCMCIA slot. In other embodiments, SC 104 may be implemented as a PCI Express Card, a mini-PCI Express module, or other similar cards or modules that enable connectivity to a host computer. In another embodiment (not depicted in FIG. 2), SC 104 may be implemented as a device external to UD 102 (e.g., a device coupled to UD 102 using one or more cables or connectors). In one such embodiment, SC 104 may be coupled to host UD 102 using a USB interface.

As described herein, SC 104 is able to be in a powered-on state regardless of the power state of the associated host computer UD 102. As depicted in FIG. 2, in one embodiment, SC 104 includes an independent power source (illustratively, PS 207). In one embodiment, for example, PS 207 may be implemented as a rechargeable battery. In another embodiment, SC 104 may be powered through the host computer power source (e.g., battery or AC power supply), even when the host computer UD 102 is powered off. In one embodiment, in which SC 104 is implemented using a Cardbus interface, SC 104 may support at least D0, D1, D2, and D3 power states on the Cardbus interface and may be able to maintain power, irrespective of the power state of host computer UD 102, at the D3 cold state.

As described herein, UD 102 may support numerous different power states. In one embodiment, power states supported by UD 102 may include inactive power states (e.g., powered off, powered on but in a dormant mode, powered on but in a sleep mode, and the like, as well as various combinations thereof) and active power states (e.g., powered on and active). Similarly, SC 104 may support numerous different power states. In one embodiment, power states supported by SC 104 may include inactive power states (e.g., powered off, powered on but in a dormant mode, powered on but in a sleep mode, and the like, as well as various combinations thereof) and active power states (e.g., powered on and active). A device or component described herein as being in an active power state or an inactive power state is more commonly referred to herein as being active or inactive, respectively.

As depicted in FIG. 2, NIM 202 includes a network interface module adapted for supporting communications of SC 104 and UD 102. The NIM 202 may be configured to interface with various different wireline and wireless networks (illustratively, AN 106). The NIM 202 includes at least one wireless interface supporting the Simple Messaging System (SMS), such as GSM, UMTS, CDMA, 1xEVDO, and the like. The NIM 202 operates as a transmitter and receiver for transmitting and receiving information associated with SC 104 and associated UD 102. In one embodiment, for example, NIM 202 may be implemented as a modem (e.g., wireline modem, wireless modem, and the like) providing network connectivity, for SC 104 and associated UD 102, over one or more associated access networks (illustratively, AN 106).

As depicted in FIG. 2, HIM 204 operates as an interface between SC 104 and UD 102. The HIM 204 facilitates transfer of information from SC 104 to US 102. For example, HIM 204 facilitates the transfer of messages received over a secure connection (e.g., from MA 119 or MSs 118 via SG 112) for immediate delivery to UD 102 if UD 102 is active when the messages are received, for delayed delivery to UD 102 (after being stored in CM 210) if UD 102 is inactive when the messages are received, and the like. The HIM 204 facilitates transfer of information from UD 102 to SC 104. For example, HIM 204 facilitates the transfer of messages generated by UD 102 (e.g., manually by one or more users via a user interface, automatically by one or more processors or modules, and the like) for immediate transmission over a secure connection to SG 112 if a secure connection is available, for storage in CM 210 until a secure connection to SG 112 becomes available, and the like.

The SCs 206 include any additional circuits that cooperate with CP 201, CM 210, NM 215, and other components of SC 104 to provide various functions of the present invention. In one embodiment, SCs 206 may include one or more power circuits adapted for supplying power to SC 104 while UD 102 is inactive (i.e., powered-off). In one embodiment, as described herein, such power circuits may support at least various different power states for SC 104, e.g., the D0, D1, D2, and D3 power states on the Cardbus (32-bit) PC-Card interface including maintaining power of SC 104 at D3 hot or cold states. In one embodiment, SCs 206 may include other processors, communication circuits, input-output modules, and like circuits and modules adapted for providing various functions of SC 104.

The AM 208 includes a module adapted for supporting the external alerting functions of the present invention. The AM 208 provides the external alerting functions of the present invention using an external alert device (EAD) 209. The EAD 209 may be any device, or combination of devices, adapted for providing a visual and/or audible alert indicating that a message is available, acknowledging that an available message has been delivered, and the like, as well as various combinations thereof. For example, EAD 209 may include one or more light emitting diodes (LEDs), one or more speakers, and like devices adapted for presenting alerts, as well as various combinations thereof. The AM 208 and EAD 209 are adapted for generating and presenting alerts irrespective of the power state of the associated UD 102 (i.e., even when UD 102 is inactive).

The AM 208 is adapted for activating an external alert in response to detecting an available message. In one embodiment, in response to receiving a message at SC 104, NIM 202 provides the received message to CP 201, which stores the message in NM 215 and triggers AM 208 to generate an external alert associated with the available message. In one embodiment, AM 208 activates the external alert by generating an alert activation signal and providing the alert activation signal to EAD 209. In one embodiment, for example, AM 208 may trigger EAD 209 to provide a visual and/or audible alert. In one embodiment, for example, AM 208 may trigger EAD 209 to light an LED (or a combination of LEDs), play a sound or combination of sounds, and the like, as well as various combinations thereof.

In one embodiment, in which AM 208 triggers EAD 209 to light an LED, AM 208 may trigger EAD 209 to light the LED a specific color. The color that the LED is lit may depend on a number of factors, including message type of the available message (e.g., text, voice, video, and the like, as well as various combinations thereof), message priority of the available message (e.g., high priority, medium priority, and low priority, and the like), the number of messages currently available and awaiting acknowledgment, and like factors, as well as various combinations thereof. In one example, a text message may result in a blue light while a voicemail may result in a green light. In another example, a high priority message may result in a red light (irrespective of message type) while a low priority message may result in a green light.

In one embodiment, in which AM 208 triggers EAD 209 to light an LED (or multiple LEDs), AM 208 may trigger EAD 209 to light a specific number of LEDs, a specific combination of LEDs, and the like. The number of LEDs lit, or the specific combination of LEDs lit, may depend on a number of factors, including message type of the available message (e.g., text, voice, video, and the like, as well as various combinations thereof), message priority of the available message (e.g., high priority, medium priority, and low priority, and the like), the number of messages currently available and awaiting acknowledgment, and like factors, as well as various combinations thereof. In one example, a text message may result in one LED being lit, while a multimedia message may result in three LEDs being lit. In another example, a high priority message may result in three LEDs being lit while a low priority message may result in one LED being lit (irrespective of message type).

Although primarily depicted and described herein with respect to embodiments in which different color LEDs, or different numbers and/or combinations of LEDs, are lit in order to alert users to available messages, combinations of such embodiments may also be used in order to alert users regarding available messages. For example, the colors of LEDs may indicate message type and the number of LEDs lit may indicate message priority. Although primarily depicted and described herein with respect to LEDs which remain lit, in other embodiments flashing LEDs and/or lasers may be used in order to alert users to available messages (e.g., based on the frequency, pattern, and the like with which the LEDs and/or lasers flash). Furthermore, although primarily depicted and described herein with respect to embodiments in which visual alerts are implemented using LEDs, various other visual display means may be used in order to alert users to available messages.

In one embodiment, in which AM 208 triggers EAD 209 to play a sound or a series of sounds, the number, tone, volume, frequency, and rhythm of the sound or sounds (as well as any other configurable parameter) may depend on a number of factors, including message type of the available message, message priority of the available message, the number of messages currently available and awaiting acknowledgment, and like factors, as well as various combinations thereof. In one example, a text message may result in a single beep once every 10 seconds while a voicemail may result in a repeated loop of three beeps in a row followed by 5 seconds of silence. In another example, a high priority message may result in a 7 dB beep while a low priority message may result in a 3 dB beep.

The AM 208 is adapted for deactivating an external alert in response to detecting that an available message has been acknowledged (e.g., has been delivered to UD 102 and displayed via one or more user interfaces, has been delivered to UD 102 which in turn triggered a notification to one or more other devices associated with UD 102, and the like). In one embodiment, for example, in response to detecting that UD 102 becomes active (e.g., the user turns on the power of UD 102, the user wakes UD 102 from a sleep mode, and the like), CP 201 retrieves available messages being stored in CM 210 and provides the available messages to HIM 204 for delivery to UD 102, and triggers AM 208 to deactivate one or more external alerts associated with the delivered message(s).

In one embodiment, AM 208 deactivates an external alert by generating an alert deactivation signal and providing the alert deactivation signal to EAD 209. Upon receiving the alert deactivation signal from AM 208, EAD 209 no longer presents the external alert. In one embodiment, in which the alert to be deactivated is being provided by lit and/or flashing LEDs, LEDs previously lit and/or flashing to indicate one or more available messages are no longer lit or flashing. In one embodiment, in which the alert to be deactivated is being provided by a speaker playing various sounds to indicate that one or more messages is available, speakers previously playing sounds indicate one or more available messages no longer play the sounds. The deactivation of an alert depends on the device(s) with which the alert was being presented.

As depicted in FIG. 2, CM 210 is a memory partitioned into two units: a volatile memory (VM) 211 and a nonvolatile memory (NM) 215. The VM 211 may be any memory used for temporary storage (e.g., DRAM, SDRAM, and the like, as well as various combinations thereof). The VM 211 temporarily stores an operating system (OS) 212, kernel drivers (KDs) 213, and programs 214, as well as various other processing functions. The NM 215 may be any memory used for permanent storage (e.g., flash memory). The NM 215 permanently stores applications 216 and data 217 where data 217 includes messages received at and stored by SC 104 regardless of the power state of host computer UD 102.

The OS 212 is an on-card operating system hosting on-card functions, applications, services, and the like adapted for supporting various functions of the present invention. The OS 212 operates in conjunction with KDs 213 and programs 214 of VM 211, and applications 216 and data 217 of NM 215, as well as various other components of SC 104, to provide various functions of the present invention, as depicted and described herein.

The applications 216 may include client-side applications associated with messaging applications of MA 119 and/or MSs 118. For example, applications 216 may include text message applications, voicemail message applications, video message applications, and the like, as well as various combinations thereof. The applications 216 may also include various other applications adapted for performing functions of the present invention (e.g., initiating secure connections, encrypting/decrypting messages, and the like, as well as various combinations thereof).

The data 217 may include any data. The data 217 includes data in support of functions of the present invention. For example, data 217 may include security certificates, end-user authentication data, client synchronization data, and the like, as well as various combinations thereof. The data 217 includes content data. For example, data 217 includes available messages awaiting delivery to UD 102 while UD 102 is inactive. The data 217 may include various other types of data for use in performing functions of the present invention.

Although primarily depicted and described herein with respect to specific components supporting specific functions of the present invention. For example, SC 104 may include additional components such as additional communication modules (e.g., internal and/or external communication modules), full IP stack operations, specific encryption-decryption modules, simulator (SIM) compatibility, embedded flash memory, embedded processor subsystems, integrated infrastructure for two-factor authentication, an external on/off switch for NIM 202 and/or EAD 209 that is independent of the power state of the associated UD 102, and the like, as well as various combinations thereof.

As depicted in FIG. 2, UD 102 includes a host processor (HP) 221, a client interface module (CIM) 222, an input-output module (IOM) 224, support circuits (SCs) 226, and a host memory (HM) 230. The HP 221 communicates with, and manages interactions between, each of CIM 222, IOM 224, SCs 226, and HM 230 for performing at least a portion of the functions of the present invention, including presenting available messages to one or more end users (via IOM 224), providing notification (including short-range and/or long-range notification) of available messages to one or more other user devices (via IOM 224 and, optionally, SC 104), and the like, as well as various combinations thereof, as depicted and described herein.

The HP 221 is adapted for providing available messages to IOM 224 for presentation to one or more end users via one or more user interfaces. In one embodiment, HP 221 provides available messages to IOM 224 for presentation to an end user in response to UD 102 switching from an inactive state to an active state. In one embodiment, HP 221 provides available messages to IOM 224 for presentation to an end user in response to an end user initiating a request to retrieve available messages (e.g., to retrieve messages received at UD 102 since the last time that UD 102 switched from an active state to an inactive state). The HP 221 is adapted for triggering notifications of available messages to IOM 224 for notification to one or more other user devices.

As depicted in FIG. 2, CIM 222 operates as an interface between UD 102 and SC 104. The CIM 222 facilitates transfer of information from UD 102 to SC 104. For example, CIM 222 facilitates the transfer of information generated by UD 102 (e.g., manually generated by one or more end users via a user interface, automatically generated by UD 102, and the like) for immediate transmission over a secure connection to SG 112 if a secure connection is available, for storage in CM 210 until a secure connection to SG 112 becomes available, and the like. The CIM 222 facilitates transfer of information from SC 104 to UD 102. For example, CIM 222 facilitates the transfer of messages received over a secure connection (e.g., from MA 119 and/or MSs 118 via SG 112) for presentation to one or more users via IOM 224, for notification to one or more users via IOM 224, and the like, as well as various combinations thereof.

The IOM 224 is adapted for interfacing with various user interfaces. The IOM 224 receives information provided by one or more users via one or more input user interfaces (e.g., a keyboard, a mouse, and the like). The IOM 224 provides the received information from input user interfaces to HP 221 for processing. The IOM 224 receives processed information from HP 221 (information from CIM 222 and/or HM 230). The IOM 224 presents information from CIM 222 and/or HM 230 to one or more users via one or more output user interfaces (e.g., a display, a speaker, and the like). In other words, IOM 224 supports any user interaction and presentation capabilities available from a computer, phone, and like user devices.

The SCs 226 include any additional circuits that cooperate with HP 221, CIM 222, IOM 224, and HM 230, as well as any other components of US 102, and, optionally, components of SC 104, to provide various functions of the present invention. In one embodiment, for example, SCs 226 may include one or more processors, microprocessors, controllers, microcontrollers, transmitters, receivers, storage devices, power circuits, and the like, as well as various combinations thereof. In one embodiment, SCs 226 may include other processors, communication circuits, input-output modules, and like circuits and modules adapted for providing various functions of UD 102.

As depicted in FIG. 2, HM 230 is a memory storing an operating system (OS) 231, kernel drivers (KDs) 232, programs 233, support libraries (SLs) 234, applications 235, and data 236. In one embodiment, HM 230 is a non-volatile memory. The OS 231 is an on-host operating system hosting various functions, applications, services, and the like, adapted for supporting various functions of the present invention. The OS 231 operates in conjunction with KDs 232, programs 233, SLs 234, applications 235, and data 236, as well as other components of US 102, and SC 104, to provide various functions of the present invention, as depicted and described herein.

The applications 235 may include host-side applications associated with corresponding client-side applications of SC 104, as well as messaging applications such as MA 119 or messaging applications of MSs 118 (e.g., text message applications, voicemail message applications, multimedia message applications, and the like, as well as various combinations thereof). The applications 235 may include other applications adapted for performing functions of the present invention (e.g., processing available messages for presentation to one or more end users, triggering notifications for available messages, and the like, as well as various combinations thereof). The data 236 may include any data, including data in support of functions of the present invention, as well as content (e.g., available messages awaiting presentation to users via UD 102), and the like, as well as various combinations thereof.

As described herein, SC 104 and UD 102 cooperate to perform various functions of the present invention. The SC 104 receives an available message (e.g., from a messaging application such as MA 119, or hosted on MSs 118) regardless of whether UD 102 is active or inactive. The SC 104 stores the received available message in local memory (e.g., CM 210). The SC 104 (e.g., one of client applications 215 corresponding to the received message) alerts the user of the available message (e.g., a visual and/or audio alert). If UD 102 is inactive, SC 104 either triggers (or waits for the user to trigger) UD 102 to switch from inactive to active. Upon switching from inactive to active, client application 215 on SC 104 informs a corresponding host application 235 on UD 102 of the available message. The host application 235 provides the message to the user (e.g., to one or more user interfaces of UD 102), provides notification of the message to one or more user devices, and the like, as well as various combinations thereof. The SC 104 deactivates the alert upon delivery of the message or notification of the message.

The operation of UD 102, including client components of SC 104 host components of UD 102, in coordination with SG 112, as well as MS 116 (which manages communications between SC 104 and SG 112) and MA 119 and MSs 118, in performing various functions of the present invention may better understood with respect to FIGS. 3-6, as depicted and described herein. Although primarily depicted and described herein using four different method figures, as described herein, various portions of methods depicted and described herein may be combined to form different embodiments of the present invention. The present invention is not intended to be limited to the specific methods depicted and described herein with respect to FIGS. 3-6.

Figure 3:
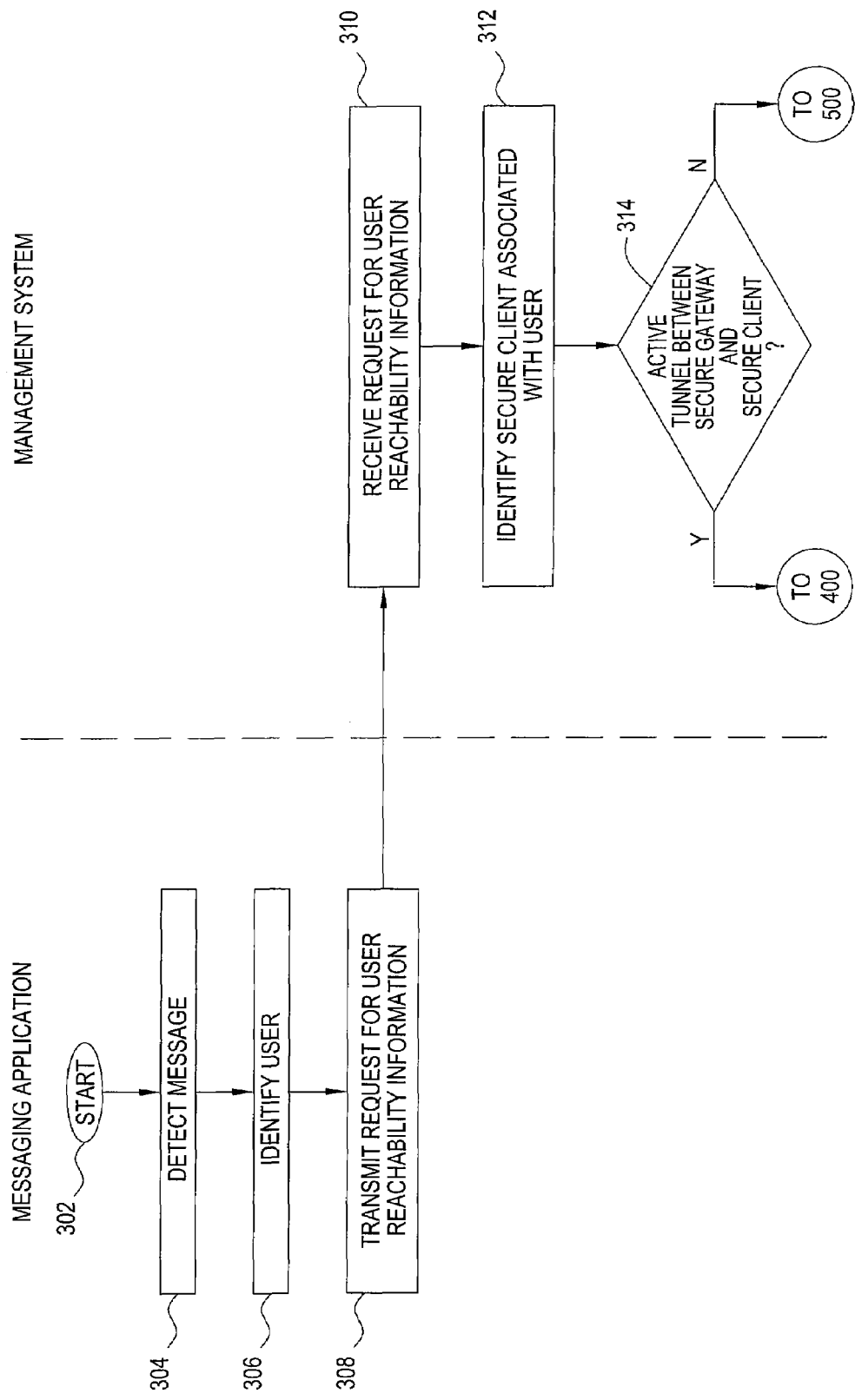
FIG. 3 depicts a method according to one embodiment of the present invention.

FIG. 3 depicts a method according to one embodiment of the present invention. Specifically, method 300 of FIG. 3 includes a method for determining whether a secure connection exists between a secure client and a secure gateway. In one embodiment, the determination as to whether or not a secure connection exists between a secure client and a secure gateway is performed in response to a request by a messaging application (or system) that receives a message intended for a user. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, a messaging application detects a message intended for delivery to a user. The message may be any type of message, including a text message, a voicemail message, a multimedia message, and the like, as well as various combinations thereof. The messaging application is a messaging application of a private network (such as an enterprise network or other private network), and may be a messaging application corresponding to the message type of the detected message (e.g., a text messaging application for a text message, a voicemail messaging application for a voicemail message, a multimedia messaging application for a multimedia message, and the like).

At step 306, the messaging application identifies the user for which the detected message is intended. Since the UD 102 may be located in any access network, and the IP address of the UD 102 is not known a-priori, SG 112 must find a way to locate UD 102 without using IP addresses. For example, UD 102 may be identified using one or more identifiers included with the message, including an email address, a Session Initiation Protocol (SIP) address or some other identifier, and the like, as well as various combinations thereof.

At step 308, the messaging application transmits a request for user reachability information. The messaging application transmits the request for user reachability information to a management system. The management system is a system adapted for managing secure connections between secure clients (utilized by remote users to establish secure connections with a private network) and one or more secure gateways of a private network. At step 310, the management system receives the request from the messaging application for user reachability information.

At step 312, the management system identifies the secure client associated with the user. In one embodiment, the management system identifies the secure client associated with the user using user information included within the request for user reachability information (e.g., using a user identifier determined by the messaging application using one or more identifiers included with the message, as determined in step 306). In one such embodiment, for example, the management system may maintain a database including associations between a user (as identified using one or more user identifiers) and a secure client by which the user securely accesses the private network using a user device from a remote location outside of the private network (e.g., while working from home).

At step 314, the management system determines whether a secure connection already exists between the secure client and a secure gateway of the private network. In one embodiment, in which the management system is adapted for managing secure connections between secure clients and one or more secure gateways of the private network, the management system may maintain one or more tables tracking secure connections between secure clients and secure gateways. If a secure connection exists between the secure client and the secure gateway, method 300 proceeds to method 400, depicted and described herein with respect to FIG. 4. If a secure connection does not exist between the secure client and the secure gateway, method 300 proceeds to method 500, depicted and described herein with respect to FIG. 5.

Figure 4:
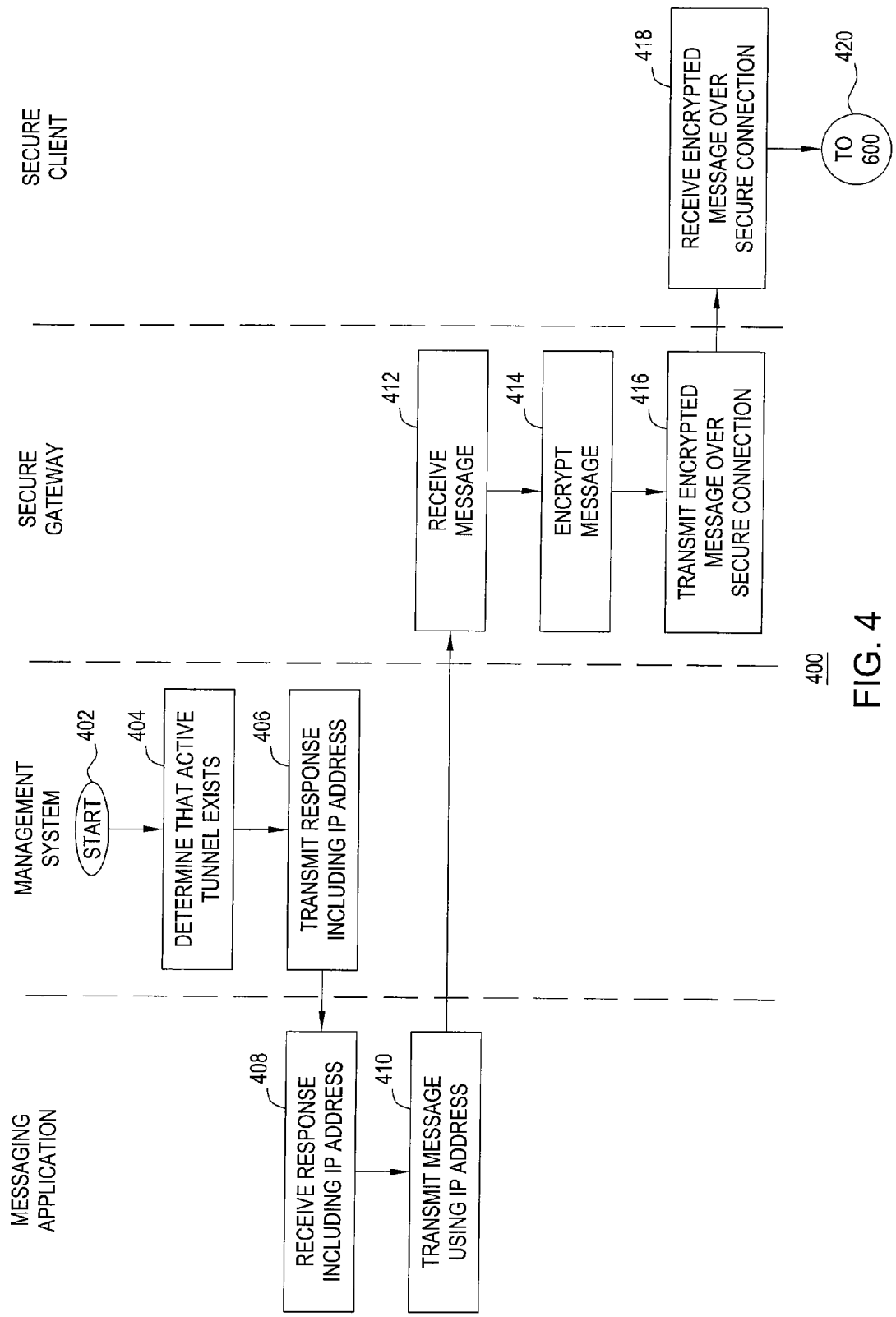
FIG. 4 depicts a method according to one embodiment of the present invention.

FIG. 4 depicts a method according to one embodiment of the present invention. Specifically, method 400 of FIG. 4 includes a method for delivering an available message from a messaging application in a private network to a secure client when a secure connection exists between the secure client and a secure gateway of the private network when the available message is detected by the messaging application. Although depicted and described as a continuation of method 300 of FIG. 3, method 400 of FIG. 4 may be used independently of method 300 of FIG. 3, as well as in conjunction with various other embodiments of the present invention. Although depicted and described as being performed serially, at least a portion of the steps of method 400 of FIG. 4 may be performed contemporaneously, or in a different order than depicted and described with respect to FIG. 4. The method 400 begins at step 402 and proceeds to step 404.

At step 404, the management system determines that a secure connection exists between the secure client and secure gateway. In one embodiment, the management system determines that the secure connection exists as depicted and described in method 300 of FIG. 3. At step 406, the management system transmits a response to a messaging application (e.g., to a messaging application from which a request for user reachability information was received, as depicted and described with respect to method 300 of FIG. 3). In one embodiment, the response includes an IP address of the secure client associated with the user. At step 408, the messaging application receives the response from the management system.

At step 410, the messaging application transmits the message toward the secure client using the IP address of the secure client included in the response from the management system. Since a secure connection between the secure client and the secure gateway exists when the message becomes available at the messaging application, the messaging application does not have to wait for the secure connection to be established; rather, the messaging application can provide the available message to the secure client immediately using the existing secure connection between the secure client and the secure gateway.

At step 412, the secure gateway receives the available message transmitted by the messaging application intended for delivery to the secure client. At step 414, the secure gateway encrypts the message. The message may be encrypted using any type of encryption. At step 416, the secure gateway transmits the encrypted available message to the secure client over the secure connection. At step 418, the secure client receives the encrypted available message from the secure gateway over the secure connection. At step 420, method 400 proceeds to method 600, depicted and described herein with respect to FIG. 6.

Figure 5:
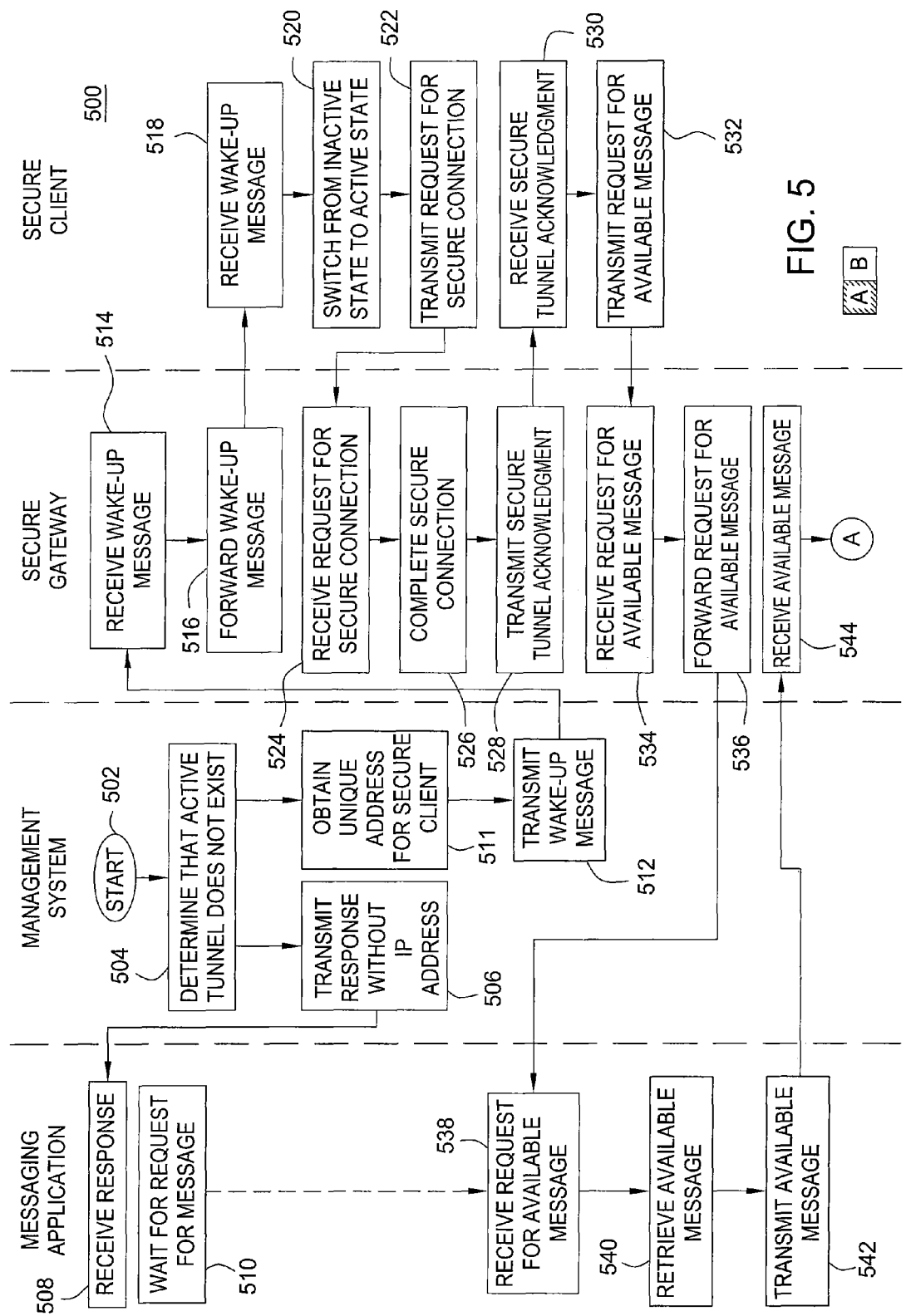
FIG. 5 depicts a method according to one embodiment of the present invention.

FIG. 5 depicts a method according to one embodiment of the present invention. Specifically, method 500 of FIG. 5 includes a method for delivering an available message from a messaging application in a private network to a secure client when a secure connection does not exist between the secure client and a secure gateway of the private network when the available message is detected by the messaging application. Although depicted and described as a continuation of method 300 of FIG. 3, method 500 of FIG. 5 may be used independently of method 300 of FIG. 3, as well as in conjunction with various other embodiments of the present invention. Although depicted and described as being performed serially, at least a portion of the steps of method 500 of FIG. 5 may be performed contemporaneously, or in a different order than depicted and described with respect to FIG. 5. The method 500 begins at step 502 and proceeds to step 504.

At step 504, the management system determines that a secure connection does not exist between the secure client and secure gateway. In one embodiment, the management system determines that the secure connection does not exist as depicted and described in method 300 of FIG. 3. In one embodiment, as depicted in FIG. 5, from step 504 method 500 proceeds to steps 506 and 512 contemporaneously. Although depicted and described as being performed in parallel, in other embodiments, steps 506 and 512 may be performed in series (e.g., step 506 is performed before step 512 or step 512 is performed before step 506).

At step 506, the management system transmits a response to a messaging application (e.g., to a messaging application from which a request for user reachability information was received, as depicted and described with respect to method 300 of FIG. 3). In one embodiment, the response includes a value other than an IP address of the secure client associated with the user (e.g., a blank value, an email address of the user, a telephone number of the user, and the like). At step 508, the messaging application receives the response from the management system.

At step 510, in response to determining that the response includes a value other than an IP address, the messaging application is triggered to wait for a request from the secure client for the available message (received by the messaging application at step 538, as depicted and described herein). Since a secure connection between the secure client and the secure gateway does not exist, the messaging application waits until the management system triggers the secure client to establish a secure connection with the secure gateway of the private network and, after the secure connection is established, the secure client requests delivery of the available message from the messaging application to the secure client using the secure connection between the secure client and the secure gateway.

At step 511, the management system obtains a unique address for the secure client. The unique address for the secure client is unique within the network such that the management system can identify the secure client irrespective of the access network with which the secure client is associated. For example, in several wireless networks, such as GPRS, UMTS, EVDO, and the like, each secure client is uniquely identified by a telephone number.

At step 512, the management system transmits, to the secure client, a message adapted for triggering the secure client to switch from an inactive state to an active state. The management system uses the unique address for the secure client to transmit the message adapted for triggering the secure client to switch from an inactive state to an active state. Since the message adapted for triggering the secure client to switch from an inactive state to an active state basically triggers the secure client to wake up from a sleep mode or dormant mode to an active mode, the message is also referred to herein as a wake-up message.

In one embodiment, depicted in FIG. 5, the management system transmits the wake-up message via the secure gateway. In another embodiment, the management system may transmit the wake-up message using an alternative network interface or technology. For example, several mobile devices can be connected to both circuit-switched and packet-switched networks. In one embodiment, the wake-up message may be transmitted over a circuit-switched network (e.g., a paging notification to the user device). In one embodiment, the wake-up message may correspond to initiating a telephone call to the user device. In other embodiments, the wake-up message may correspond to one or more packets transmitted to a specific network address. In one embodiment, the wake-up message is a Short Message Service (SMS) message.

At step 514, the secure gateway receives the wake-up message. At step 516, the secure gateway forwards the wake-up message to the secure client. In embodiments in which the wake-up message is not transmitted by the management system via the secure gateway, steps 514 and 516 may be omitted (although it should be noted that fewer or more comparable steps may be performed by other network elements in the path traversed by the wake-up message). At step 518, the secure client receives the wake-up message from the secure gateway.

At step 520, in response to the wake-up message, the secure client switches from an inactive state to an active state (e.g., the secure client switches from a sleep mode or dormant mode to an active mode). At step 522, the secure client transmits, to the secure gateway, a secure connection request (i.e., a request to establish a secure connection between the secure client and the secure gateway). In one embodiment, the secure connection request includes authentication information adapted for use by the secure gateway to establish the secure connection, such as a certificate or other user and/or secure client authentication information. At step 524, the secure gateway receives the request for the secure connection from the secure client.

At step 526, the secure gateway completes the secure connection. In one embodiment, in which the secure connection request includes authentication information, the secure gateway completes the secure connection by authenticating the user and/or secure client using the authentication information (e.g., comparing an authentication certificate received with the secure connection request to a database of authentication information maintained by the secure gateway (or retrieved by the secure gateway from another system such as an authentication system, management system, and the like). At step 526, the secure gateway transmits a secure connection acknowledgment to the secure client, indicating that the secure connection requested by the secure client was successfully established. At step 528, the secure client receives the secure connection acknowledgment from the secure gateway.

Although primarily depicted and described herein with respect to an embodiment in which the secure client initiates establishment of the secure connection, in one embodiment the secure gateway may initiate establishment of the secure connection. Although primarily depicted and described herein with respect to an embodiment in which the secure gateway transmits an acknowledgement to the secure client indicating that the secure connection has been established, in other embodiments the secure gateway may merely establish the secure connection without transmitting an acknowledgment to the secure client (i.e., the secure client assumes that the secure connection has been established and proceeds as if there is a secure connection over which the available message may be provided to the secure client).

At step 532, the secure client transmits a request for the available message (i.e., a message detected by a messaging application, e.g., the message detected at step 304 of method 300 of FIG. 3) to the messaging application of the enterprise network via the secure gateway. In one embodiment, the request for the available message may include one or more identifiers adapted for use in retrieving the available message. In one embodiment, the secure client transmits the request for the available message using the secure connection. At step 534, the secure gateway receives the request for the available message. At step 536, the secure gateway forwards the request for the available message to the messaging application.

At step 538, the messaging application receives the request for the available message. At step 540, the messaging application retrieves the available message. In one embodiment, the messaging application retrieves the available message using one or more identifiers included in request for the available message (e.g., a message identifier, a user identifier, and the like, as well as various combinations thereof). The messaging application may retrieve the available message from one or more of a local memory associated with the messaging application, a messaging system associated with the messaging application, and the like, as well as various combinations thereof.

At step 542, the messaging application transmits the available message toward the secure client via the secure gateway. At step 544, the secure gateway receives the available message from the messaging application. At step 546, the secure gateway encrypts the available message. At step 548, the secure gateway transmits the encrypted available message to the secure client over the secure connection. At step 550, the secure client receives the encrypted available message from the secure gateway over the secure connection. At step 552, method 500 proceeds to method 600, depicted and described herein with respect to FIG. 6.

FIG. 6 depicts a method according to one embodiment of the present invention. Specifically, method 600 of FIG. 6 includes a method for alerting a user that a message is available if the user device associated with the user is inactive, and presenting the available message to the user in response to a determination that the user device has switched from an inactive state to an active state. Although depicted and described as being performed serially, at least a portion of the steps of method 600 of FIG. 6 may be performed contemporaneously, or in a different order than depicted and described with respect to FIG. 6. The method 600 begins at step 602 and proceeds to step 604.

At step 604, the secure client receives the encrypted available message. At step 606, the secure client stores the encrypted available message. As described herein, the secure client is adapted for receiving and storing the encrypted available message irrespective of whether the associated user device is in an active state or an inactive state. At step 608, the secure client activates an alert. For example, the secure client may play one or more beeps, light one or more LEDs, and the like, as well as various combinations thereof, as described herein.

At step 610, a determination is made as to whether the secure client is configured to activate the user device upon receiving an available message. If the secure client is configured to activate the user device, method 600 proceeds to step 612. At step 612, the secure client sends, to the user device, a signal adapted to activate the user device. At step 614, the user device receives the signal adapted to activate the user device. At step 616, in response to the activation signal received from the secure client, the user device switches from an inactive state to an active state. As depicted in FIG. 6, from step 616, the user device waits to receive the available message from the secure client (where waiting is represented by the dotted line from step 616 to step 624). If the secure client is not configured to activate the user device, method 600 proceeds to step 618.

At step 618, the secure client determines whether the user device has become active (i.e., whether the user device has switched from an inactive state to an active state). If the user device has not become active, method 600 loops within step 618 until the user device become active. In other words, since the secure client is not configured to activate the user device, the secure client must wait for the user to activate the user device. If the user device has become active, method 600 proceeds to step 620. At step 620, the secure client retrieves the decrypted available message. At step 622, the secure client decrypts the available message.

At step 624, the secure client transmits the available message to the user device. At step 626, the user device receives the available message from the secure client. At step 628, the user device determines whether a user interface of the user device is active (i.e., whether the available message can be presented to the user). If a user interface of the user device is not active, method 600 loops within step 628 until the user interface of the user device becomes active. If a user interface of the user device is active, method 600 proceeds to step 630.

At step 630, the user device presents the available message via one or more active user interfaces (e.g., via a speaker, a display device, and the like). At step 632, the user device sends a message acknowledgment to the secure client. At step 634, the secure client deactivates the alert in response to the acknowledgment from the user device (i.e., deactivates the alert activated at step 608). For example, the secure client may stop playing one or more beeps, turn off one or more LEDs, and the like, as well as various combinations thereof, as described herein.

Although omitted for purposes of clarity, as described herein, in some embodiments, the user device may trigger a notification to at least one other user device associated with the user (e.g., to a laptop, a mobile phone, a personal data assistant (PDA), and like user devices; using at least one of a short-range notification technology, a long-range notification technology, and the like). In one embodiment, the user device may trigger a notification in response to receiving the available message from the secure client. In one embodiment, the user device may trigger the notification to one or more other user devices in response to a determination that a user interface of the user device is not active at the time at which the user device receives the available message from the secure client.

Although primarily depicted and described herein with respect to an embodiment in which the user device is in an inactive state when the available message is received by the secure client (such that the secure client proxies for the user device until the user device is activated by the secure client or a user of the user device), as described herein the secure client may receive an available message when the user device is in an active state. In this embodiment, since the available message is delivered from the secure client to the user device at the time the available message is received by the secure client, the secure client may or may not activate the alert to the user. In one such embodiment, the secure client may still activate an alert (such as an audible and/or visual alert) to alert the user that an available message has been received and may be reviewed via the user device.

Figure 7:
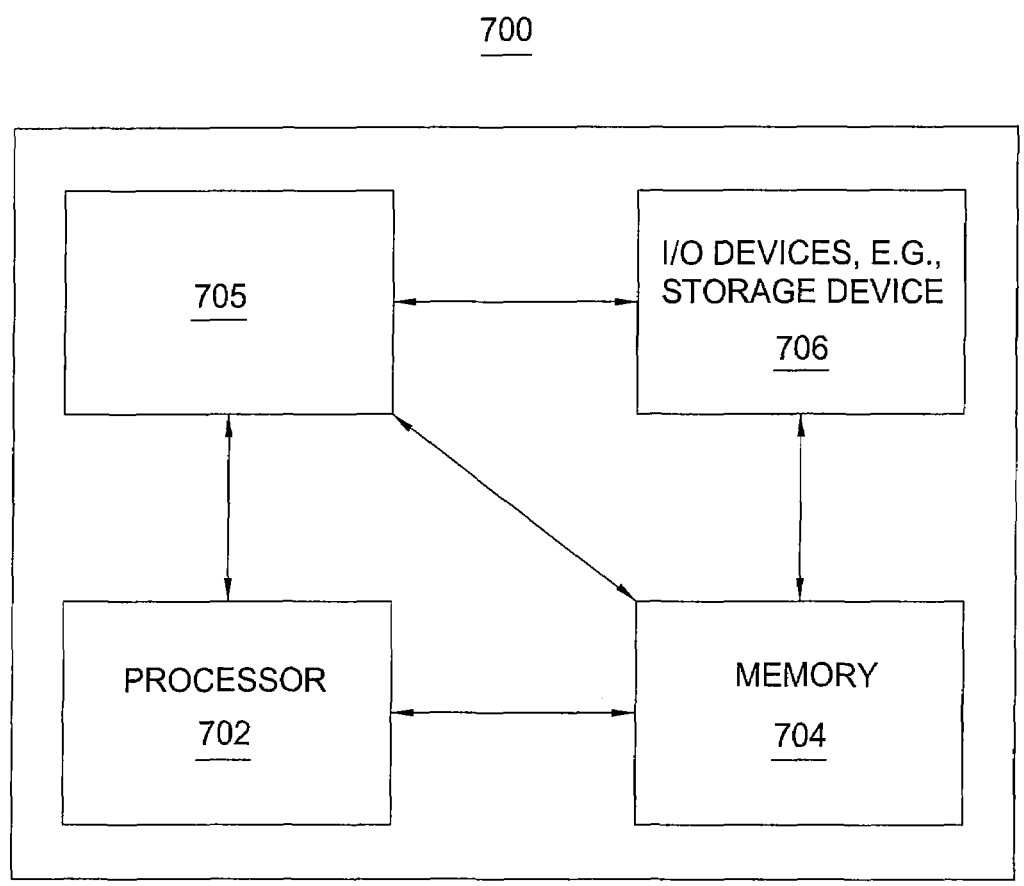
FIG. 7 depicts a high-level block diagram of a general-purpose computer suitable for use in performing the functions described herein.

FIG. 7 depicts a high-level block diagram of a general-purpose computer suitable for use in performing the functions described herein. As depicted in FIG. 7, system 700 comprises a processor element 702 (e.g., a CPU), a memory 704, e.g., random access memory (RAM) and/or read only memory (ROM), a message delivery module 705, and various input/output devices 706 (e.g., storage devices, including but not limited to, a tape drive, a floppy drive, a hard disk drive or compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present message delivery process 705 can be loaded into memory 704 and executed by processor 702 to implement the functions as discussed above. As such, message delivery process 705 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A secure client for use with a user device, comprising:
a power module for powering the secure client independent of a power state of the user device;
a communication module for receiving a wake-up message adapted for triggering the secure client to switch from an inactive state to an active state without changing the power state of the user device, the communication module adapted for initiating a secure connection with a secure gateway in response to receiving the wake-up message, the communication module adapted for requesting and receiving a message from a messaging application using the secure connection;
a storage module for storing the received message; and
an alert module for activating an alert to indicate that the message is available.

2. The secure client of claim 1, wherein the alert module activates the alert in response to a determination that the user device is in an inactive power state.

3. The secure client of claim 1, further comprising:
an alert device for presenting the activated alert.

4. The secure client of claim 3, wherein the alert device comprises at least one of a visual alert device and an audible alert device.

5. The secure client of claim 1, further comprising:
an interface module for interfacing the secure client with the user device and providing the stored message toward the user device.

6. The secure client of claim 1, further comprising:
a processor for providing a state change message toward the user device, wherein the state change message is adapted for switching the power state of the user device from an inactive state to an active state.

7. The secure client of claim 1, wherein the alert module deactivates the alert in response to the message being provided toward the user device.

8. The secure client of claim 1, wherein the storage module is configured to store the received message until the received message is provided toward the user device.

9. The secure client of claim 1, wherein the secure client is configured to provide the stored message toward the user device in response to detecting that the user device is in an active state.

10. The secure client of claim 1, wherein the secure client is configured to provide the stored message toward the user device in response to detecting the user device switching from an inactive state to an active state.

11. The secure client of claim 1, further comprising:
a processor for controlling providing of the message from the storage module of the secure client toward the user device.

12. A method, comprising:
receiving, from a messaging application, a request for user reachability information in response to a user message becoming available;
determining whether a secure connection exists between a secure gateway of a private network and a secure client; and
if the secure connection does not exist, providing toward the secure client a message adapted to trigger the secure client to switch from an inactive state to an active state, to request the secure connection to the secure gateway and, upon establishment of the secure connection, to request the available message from the messaging application of the private network;
wherein the secure client operates independent of a power state of a user device associated with the secure client.

13. The method of claim 12, further comprising:
obtaining an address of the secure client; and
providing to the secure client, using the obtained address, the message adapted to trigger the secure client to switch from an inactive state to an active state.

14. The method of claim 12, further comprising:
if the secure connection does exist, providing an address of the secure client to the messaging application of the private network, wherein the address of the secure client is adapted for use by the messaging application to provide the available message to the secure client over the secure connection.

15. A secure client for use with a user device, comprising:
a power module for powering the secure client independent of a power state of the user device;

a communication module for receiving a wake-up message adapted for triggering the secure client to switch from an inactive state to an active state without changing the power state of the user device, and for receiving a message available from a messaging application;

a storage module for storing the message; and a processor for controlling providing of the message from the storage module toward the user device in response to a determination that the user device is in an active state.

* * * * *